US005822752A

United States Patent [19]

Cheong et al.

[11] Patent Number: 5,822,752

[45] Date of Patent: Oct. 13, 1998

[54] METHOD AND APPARATUS FOR FAST PARALLEL DETERMINATION OF QUEUE ENTRIES

[75] Inventors: Hoichi Cheong, Austin; Michael Kevin Ciraula, Round Rock; Hung Qui Le; John Stephen Muhich, both of Austin, all of Tex.

[73] Assignee: International Business Machines Corporation, Armonk, N.Y.

[21] Appl. No.: 680,745

[22] Filed: Jul. 15, 1996

[51] Int. Cl.[6] .............................. G06F 12/00; G06F 13/00

[52] U.S. Cl. ............................ 711/100; 711/154; 395/821

[58] Field of Search ..................................... 395/821, 427; 711/100, 154

[56] References Cited

U.S. PATENT DOCUMENTS

| | | | |
|---|---|---|---|
| 3,629,857 | 12/1971 | Faber | 340/172.5 |
| 4,507,760 | 3/1985 | Fraser | 365/221 |
| 5,327,557 | 7/1994 | Emmond | 395/650 |
| 5,359,709 | 10/1994 | Blanc et al. | 395/200 |
| 5,638,538 | 6/1997 | VanDoren et al. | 395/821 |
| 5,664,114 | 9/1997 | Krech, Jr. et al. | 395/200.64 |

*Primary Examiner*—Tod R. Swann
*Assistant Examiner*—Tuan V. Thai
*Attorney, Agent, or Firm*—Liddell, Sapp, Zivley, Hill & LaBoon, L.L.P.; Anthony V. S. England

[57] ABSTRACT

The present invention is related to a circuit useful to manage a random order queue having a plurality of queue entries, each queue entry having an associated validity bit which indicates whether the queue entry contains valid data. In one embodiment, the circuit includes a first plurality of inputs for receiving validity signals responsive to a first group of validity bits, a second plurality of inputs for receiving shift signals responsive to a second group of validity bits, and a plurality of outputs for providing select signals to multiplexers coupled to the queue, the select signals being responsive to the shift signals and the validity signals.

10 Claims, 11 Drawing Sheets

| Va | Vb | Vc = | 0 1 1 |
|---|---|---|---|
| Oa0 | Ob0 | Oc0 = | 0 1 0 |
| Oa1 | Ob1 | Oc1 = | 0 0 1 |
| Oa2 | Ob2 | Oc2 = | 0 0 0 |
| Oa3 | Ob3 | Oc3 = | 0 0 0 |
| Oa4 | Ob4 | Oc4 = | 0 0 0 |
| Oa5 | Ob5 | Oc5 = | 0 0 0 |

Where: P0=1 and P1-P3=0

Fig. 4a

| Va | Vb | Vc = | 0 1 1 |
|---|---|---|---|
| Oa0 | Ob0 | Oc0 = | 0 0 0 |
| Oa1 | Ob1 | Oc1 = | 0 0 0 |
| Oa2 | Ob2 | Oc2 = | 0 0 0 |
| Oa3 | Ob3 | Oc3 = | 0 1 0 |
| Oa4 | Ob4 | Oc4 = | 0 0 1 |
| Oa5 | Ob5 | Oc5 = | 0 0 0 |

Where: P0-P2=0 and P3=1

Fig. 4b

| Va0 | Va1 | Va2 | Va3 | Va4 | Va5 | Va6 | Va7 | Va8 | 0 0 0 0 1 1 0 0 0 |
|---|---|---|---|---|---|---|---|---|---|
| Oa00 | Oa10 | Oa20 | Oa30 | Oa40 | Oa50 | Oa60 | Oa70 | Oa80 | 0 0 0 0 1 0 0 0 0 |
| Oa01 | Oa11 | Oa21 | Oa31 | Oa41 | Oa51 | Oa61 | Oa71 | Oa81 | 0 0 0 0 0 1 0 0 0 |
| Oa02 | Oa12 | Oa22 | Oa32 | Oa42 | Oa52 | Oa62 | Oa72 | Oa82 | 0 0 0 0 0 0 0 0 0 |
| Oa03 | Oa13 | Oa23 | Oa33 | Oa43 | Oa53 | Oa63 | Oa73 | Oa83 | 0 0 0 0 0 0 0 0 0 |
| Oa04 | Oa14 | Oa24 | Oa34 | Oa44 | Oa54 | Oa64 | Oa74 | Oa84 | 0 0 0 0 0 0 0 0 0 |
| Oa05 | Oa15 | Oa25 | Oa35 | Oa45 | Oa55 | Oa65 | Oa75 | Oa85 | 0 0 0 0 0 0 0 0 0 |

Fig. 5c

| Va0 | Va1 | Va2 | Va3 | Va4 | Va5 | Va6 | Va7 | Va8 | 1 1 1 0 1 1 0 0 0 |
|---|---|---|---|---|---|---|---|---|---|
| Oa00 | Oa10 | Oa20 | Oa30 | Oa40 | Oa50 | Oa60 | Oa70 | Oa80 | 1 0 0 0 0 0 0 0 0 |
| Oa01 | Oa11 | Oa21 | Oa31 | Oa41 | Oa51 | Oa61 | Oa71 | Oa81 | 0 1 0 0 0 0 0 0 0 |
| Oa02 | Oa12 | Oa22 | Oa32 | Oa42 | Oa52 | Oa62 | Oa72 | Oa82 | 0 0 1 0 0 0 0 0 0 |
| Oa03 | Oa13 | Oa23 | Oa33 | Oa43 | Oa53 | Oa63 | Oa73 | Oa83 | 0 0 0 0 1 0 0 0 0 |
| Oa04 | Oa14 | Oa24 | Oa34 | Oa44 | Oa54 | Oa64 | Oa74 | Oa84 | 0 0 0 0 0 1 0 0 0 |
| Oa05 | Oa15 | Oa25 | Oa35 | Oa45 | Oa55 | Oa65 | Oa75 | Oa85 | 0 0 0 0 0 0 0 0 0 |

Fig. 5d

METHOD AND APPARATUS FOR FAST PARALLEL DETERMINATION OF QUEUE ENTRIES

TECHNICAL FIELD

This invention relates to logic circuit design, more particularly, to logic circuits for implementation on integrated circuits, and more particularly still to a method and apparatus useful in controlling random-order buffers.

BACKGROUND OF THE INVENTION

In high performance CPU's, there is a need for a memory buffer with multiple entries having the following characteristics. First, the buffer must be able to take multiple input data and store it into whichever entries are available, i.e. empty. Second, the content of multiple valid buffer entries must be able to be retrieved in parallel as long as they meet certain criteria, for example, the output of a logic function that operates on status bits stored with each entry, or simply the status of being valid. Such a memory buffer is referred to as a "random order buffer," or "random order queue," and is different from first-in first-out queue in which data are stored into consecutive entries of the queue.

Controlling a random order buffer typically consists of two operations: (1) selecting a particular data input from among the multiple input data lines and storing the contents of the selected data line into a particular empty entry; and (2) selecting a subset of valid entries that meet a certain criteria or a set of criteria and retrieving the content of the valid entries through one of the output data lines.

FIG. 1 is a schematic diagram showing how data is written into a random order queue. In the example shown, the queue comprises m entries, B0–Bm. Each queue entry has an associated valid bit v0–vm which indicates whether the queue entry contains valid data. Each queue entry receives data from an associated multiplexer, MUX0–MUXm, one input multiplexer being associated with each queue entry. Each multiplexer receives data from n data lines D0–Dn, which are w-bits wide. Each multiplexer is provided with n select lines which enable data from any data line to be written into any empty queue entry. For example, with respect to queue entry B0, select lines O00–O0n are provided to MUX 0. If valid bit v0 is a logical 1, indicating that queue entry B0 is empty, then select line O00 is raised and data from data line D0 is written into queue entry B0. Reading from the queue is performed in a similar fashion.

Determining the appropriate select line, if any, for each input and output multiplexer of each queue entry is a complex process which grows even more difficult as the queue size increases. For the first queue entry, B0, this is not too difficult. If it is desired to write data into the queue and B0 is empty, the first data line is selected, otherwise, no data is written to B0. A similar process is used to determine the select lines for reading from the queue.

The difficulty of finding a fixed number, e.g. n, of empty or valid entries in setting the MUX control lines, is that the MUX select for a given entry, e.g. the "k" th entry, depends on how many entries have been found. For the storing or the input process to know exactly how many empty entries has been found will avoid selecting the data input that has been selected by another empty entry. Likewise, knowing how many entries have been selected for output before considering the kth entry, will avoid selecting an entry multiple times. If the decision process progresses in a fixed direction, the logic circuit on the input data select line needs to examine, for a kth entry, whether 0, 1, up to n empty entries have been found in order to determine the select line for the input multiplexer for the kth entry. The larger the number k, the more entries the logic circuit has to examine. Consequently, the logic circuit to handle this tends to become serial, and does not scale well for larger numbers of n.

Accordingly, it is an object of the present invention to solve the above difficulties and to provide further improvements and advantages which will become apparent in view of the following disclosure.

SUMMARY OF THE INVENTION

One aspect of the invention relates to a circuit useful to manage a random order queue having a plurality of queue entries, each queue entry having an associated validity bit which indicates whether the queue entry contains valid data. In one embodiment, the circuit comprises a first plurality of inputs for receiving validity signals responsive to a first group of validity bits; a second plurality of inputs for receiving shift signals responsive to a second group of validity bits; and a plurality of outputs for providing select signals to multiplexers coupled to the queue, the select signals being responsive to the shift signals and the validity signals.

Another aspect of the invention relates to a system for managing a random order queue having a plurality of queue entries, each queue entry having an associated validity bit which indicates whether the queue entry contains valid data. In one embodiment, the system comprises a first circuit having a first plurality of inputs for receiving validity signals responsive to a first group of validity bits, a first plurality of outputs for providing select signals to a first group of multiplexers coupled to the queue, the select signals being responsive to the validity signals, and a second plurality of outputs for providing shift signals responsive to the first group of validity bits; and a second circuit having a first plurality of inputs for receiving validity signals responsive to a second group of validity bits, a second plurality of inputs for receiving shift signals from the second plurality of outputs of the first circuit, a plurality of outputs for providing select signals to a second group of multiplexers coupled to the queue, the select signals being responsive to the received shift signals and the validity signals responsive to the second group of validity bits.

Still a further aspect of the invention relates to a method of managing a random order queue having a plurality of queue entries and including a circuit for controlling select lines of a plurality of multiplexers which access data in the queue entries, the method comprising the steps of detecting a first set of validity bits associated with a first group of queue entries; generating a bit pattern responsive to the first set of validity bits, the bit pattern having a high bit for activating a select line of one of the multiplexers; receiving a shift signal responsive to a second set of validity bits associated with a second group of queue entries; shifting the high bit in the bit pattern responsive to the shift signal; and impressing signals on the select lines of the multiplexer, the signals being responsive to the bit pattern.

Yet a further aspect of the invention relates to a system for managing a random order queue having a plurality of queue entries, each entry having an associated validity bit which indicates whether the queue entry contains valid data, the system comprising a plurality of cascaded modular circuits, each circuit including a validity detect circuit having a plurality of inputs for receiving validity signals responsive to a first group of validity bits; a shift block having a plurality of inputs for receiving shift signals from an upstream circuit, a first plurality of outputs for providing shift signals to a downstream circuit, and a second plurality of outputs for providing select signals to multiplexers coupled to the queue, the select signals being responsive to the validity signals and the shift signals received from the upstream circuit.

BRIEF DESCRIPTION OF THE DRAWINGS

FIG. 4A is a truth table for illustrating the operation of the circuit shown in FIG. 3 according to an embodiment of the invention.

FIG. 4B is a truth table for illustrating the operation of the circuit shown in FIG. 3 according to a further embodiment of the invention.

FIG. 5C is a truth table illustrating the operation of the circuit shown in FIG. 5B according to an embodiment of the invention.

FIG. 5D is a truth table illustrating the operation of the circuit shown in FIG. 5B according to still a further embodiment of the invention.

DETAILED DESCRIPTION OF EMBODIMENTS OF THE INVENTION

Figure 1:
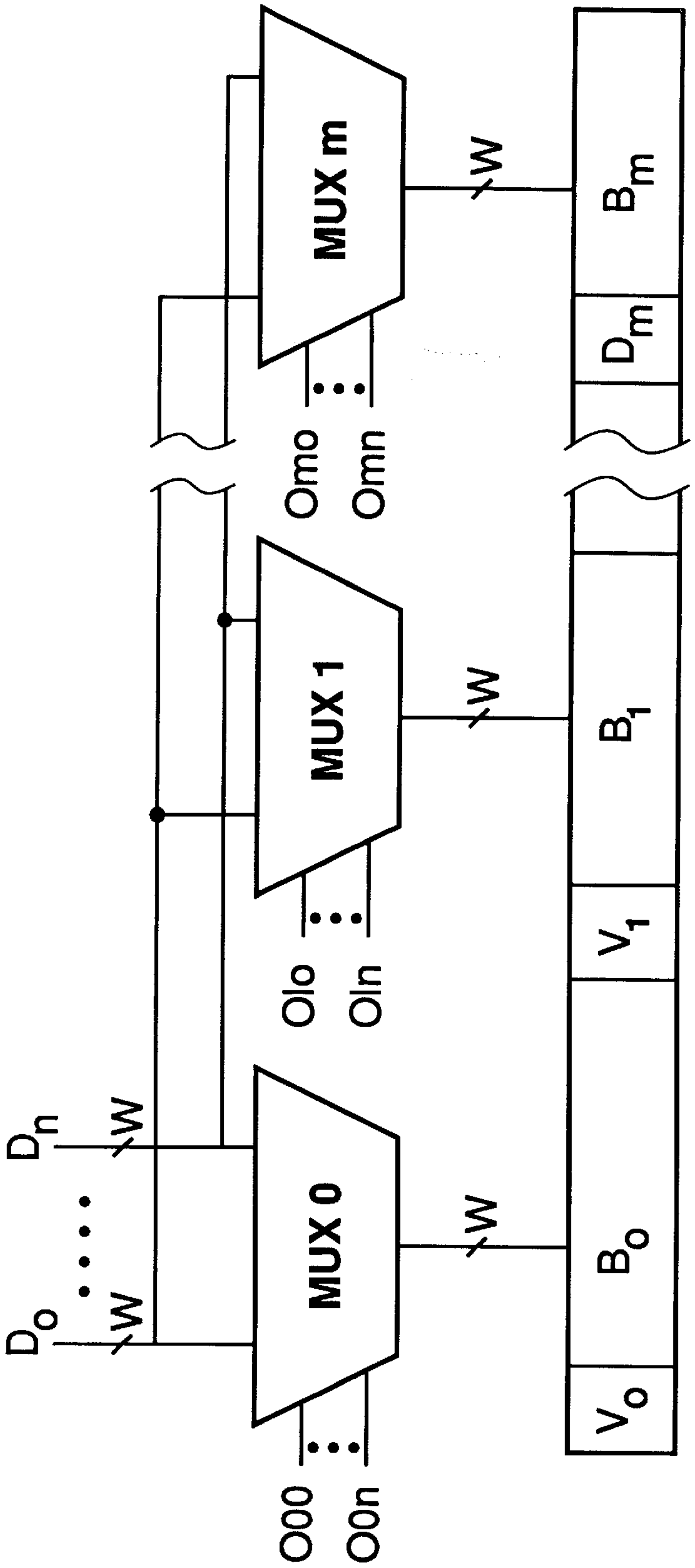
FIG. 1 is a schematic diagram of a conventional random order queue.
Figure 2:
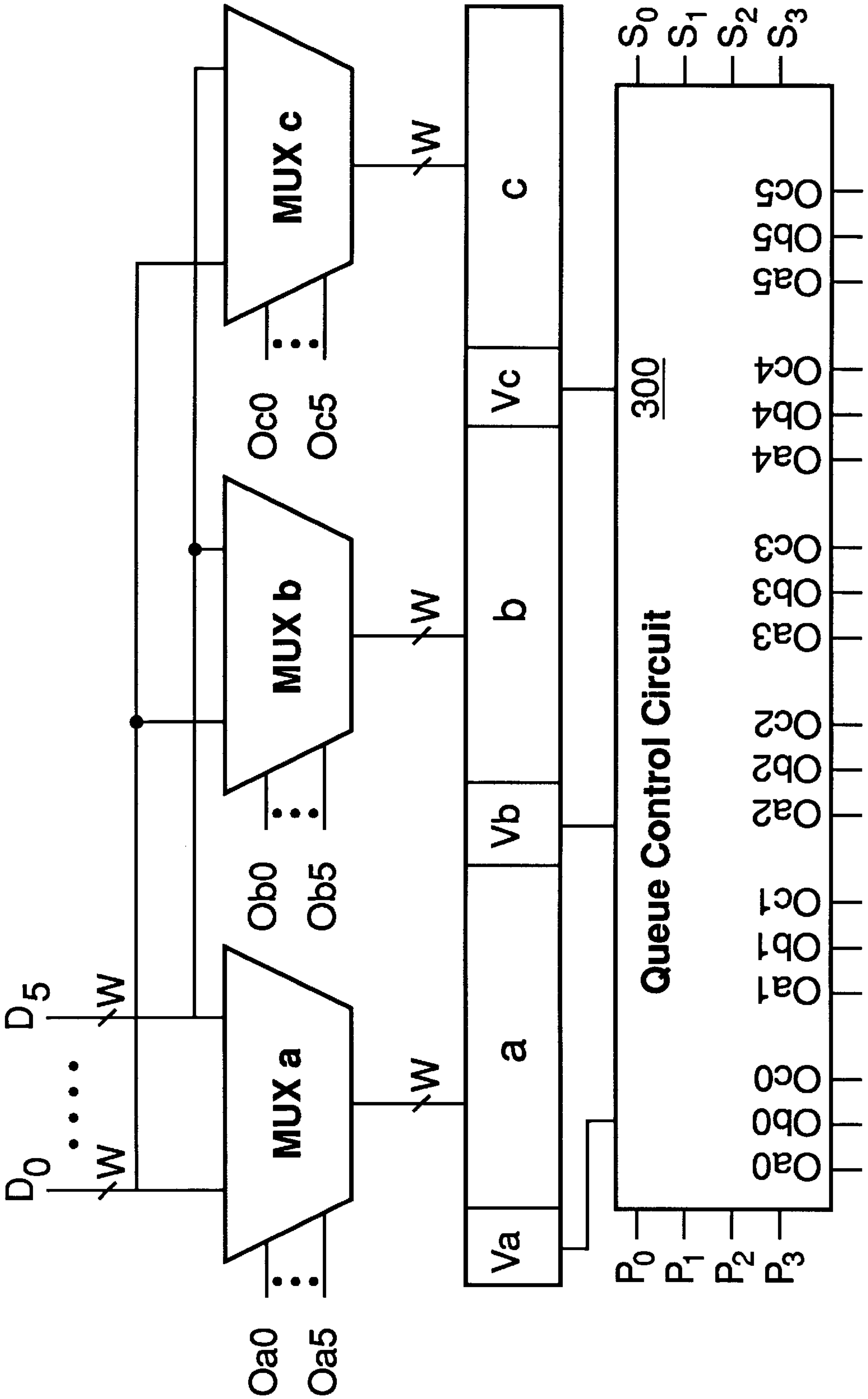
FIG. 2 is a schematic diagram of a random order queue control circuit according to an embodiment of the invention.

FIG. 2 is a schematic diagram of a random order queue coupled to a cascadable queue control circuit according to an embodiment of the invention. This circuit illustrates the circuitry required for writing data into the queue. Reading data from the queue will be described in greater detail herein. For purposes of illustration, a simplified queue is shown which comprises only three registers, or queue entries. However, as will be described in greater detail later, the queue control circuit 300 comprises at least one validity detect circuit which is cascadable with additional validity detect circuits so that a queue having any number of entries may be managed.

The simplified queue shown in FIG. 2 comprises three queue entries denoted a, b and c. Each queue entry also has an associated validity bit va, vb and vc, respectively. Data lines D0–D5 are each w bits wide and are multiplexed into queue entries a, b and c by multiplexers MUXa, MUXb, and MUXc respectively.

Multiplexers MUXa–MUXc are conventional 6:1 multiplexers having select lines Oa0–Oa5, Ob0–Ob5 and Oc0–Oc5, respectively, which correspond to data lines D0–D5. When a select line is raised high, i.e., logic level 1, the corresponding data line is selected, and data on the selected data line is passed to the multiplexer output and into the associated queue entry.

Operation of select lines, and therefore, control of the data written into the queue, is performed by the queue control circuit 300 according to the status of validity bits va–vc. It is assumed that data is written into the queue in a predefined order. For example, if data is available on data line D0, then D0 will be stored in the first empty queue entry found by searching from a to c. In this example, if entry a happens to be occupied and b is an empty entry, D0 will be stored in b. The searching order from a to c by no means implies a sequential process. The logic operation of determining putting D0 into either entry a or entry b is carried out in parallel. In this predefined order of search for the first empty entry, we can easily recognize that in case there are multiple data lines, D0 through Dk, whether an empty entry Bm will receive Dk depends on whether Bm is the (k+1)th empty entry in the predefined search order. The queue control logic 300 ensures such an outcome.

Queue control circuit 300 also comprises inputs P0–P3 and outputs S0–S3 for sending and receiving shift signals to cascaded control circuits as will be described in greater detail herein. In the embodiment of FIG. 2, the queue control circuit comprises only one validity detect circuit.

Figure 3:
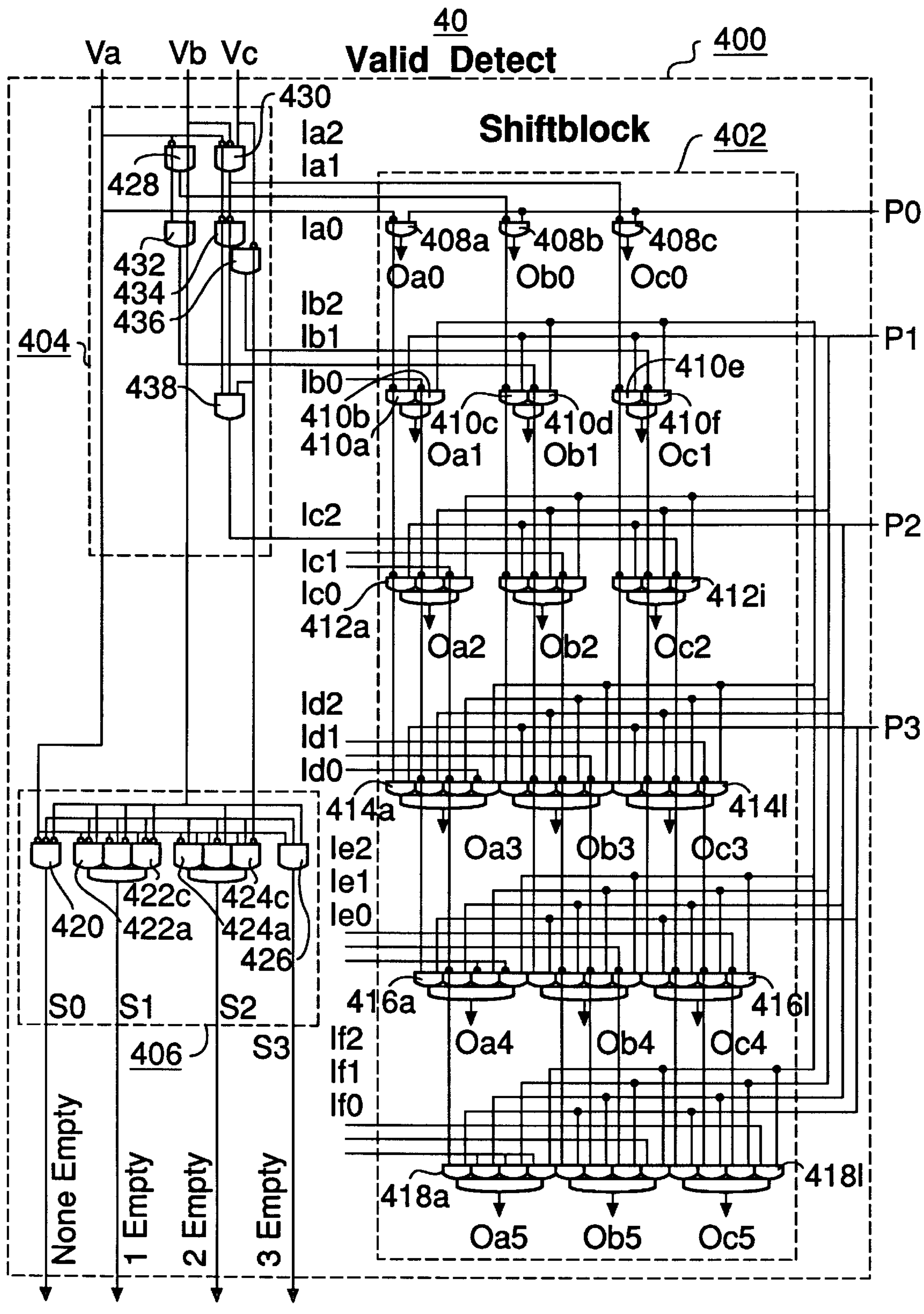
FIG. 3 is a schematic diagram of a random order queue control circuit according to an embodiment of the invention.

FIG. 3 is a schematic diagram of a validity detect circuit 40 according to an embodiment of the invention. The circuit comprises a validity detect block 400 and shift block 402. Validity detect block 400 further comprises validity bit input block 404 and shift signal output block 406.

Validity bit input block 404 comprises the logic necessary to sense the status of validity signals representing the logic states of validity bits va–vc provided on inputs Va–Vc, respectively. In this embodiment, the logic comprises AND gates 428, 430, 432, 436 and 438. This logic circuit is used to provide signals on intermediate signal lines Ia0–Ia2, Ib1–Ib2, and Ic2 to shift block 402. As shown, input Va receives a validity signal corresponding to validity bit va and is provided directly to shift block 402 on intermediate signal line Ia0. Input Vb is ANDed with inverted input Va by AND gate 428 and provided to shift block 402 on intermediate signal line Ia1. Input Vc is ANDed with inverted inputs Va and Vb by AND gate 430 and provided to shift block 402 on intermediate signal line Ia2.

Input signals Va–Vc are also operated on by XOR gate 434 and AND gates 432, 436 and 438. The operation of these gates is similar to that described above and will be clear to those with skill in the art.

Shift block 402 receives inputs on intermediate signal lines Ia0–Ia2 through If0–If2 and shift signal lines P0–P3. Responsive to these inputs, shift block 402 generates outputs Oa0–Oc0 through Oa5–Oc5 which control corresponding select lines on multiplexers MUXa–MUXc. In this embodiment, shift block 402 comprises six rows of AND gates, each row producing three output signals. The second row is exemplary. This row comprises AND gates 410_a_–410_f_ which are arranged in pairs. The outputs from each pair are ORed together to produce output signals Oa1–Oc1. Inputs to AND gates 410_a_–410_f_ include intermediate signal lines Ib0–Ib2 and shift signal P1. The configuration of other rows in the shift block 402 is similar to that of row two, although different numbers of AND gates are provided and coupled to the other inputs as shown in the figure.

Shift signal output block 406 provides shift signal S0–S3. Signals S0–S3 are derived from AND gates 420, 422_a_–422_c_, 424*a*–424*c* and 426, respectively. Input to these AND gates is provided by inputs Va–Vc as shown in the figure. Only one of shift signals S0–S3 is high for any combination of logic signals provided on inputs Va–Vc. These signals are used when the validity detect circuit 40 is cascaded with additional validity detect circuits to provide information to subsequent validity detect circuits concerning how many queue entries are empty in a particular upstream segment of the random order queue. In the particular embodiment illustrated, signal lines S0–S3 correspond to no empty queue entries, one empty entry, two empty entries, and three empty entries, respectively, when used for determining the number of empty entries and generating input MUX selects.

The operation of this embodiment is first described with respect to the three entry queue shown in FIG. 2, and therefore, no shifting is required. Accordingly, shift input signal P0 is high and P1–P3 are low. Additionally, the input lines to the shift block, intermediate lines Ib0, Ic0, Ic1 and Id0–If2 are set low. It should be noted that these intermediate signal lines are generally set low unless second order shifting is required as will be explained more fully herein. It will also be assumed that queue entry a is valid and queue entries b and c are empty. The convention used for purposes of this illustration is that a validity bit is low, i.e., a logic level 0, when a queue entry is valid and high, i.e., logic level 1, when the entry is empty. Therefore, in this case, validity bit va is low and validity bits vb and vc are high.

Output Oa0 is generated by ANDing intermediate line Ia0 and shift input line P0. Since input Va is low, intermediate line Ia0 is also low, which, in turn, causes output Oa0 to be low. Output Ob0 is generated by ANDing signal line Ia1 with input P0. Signal line Ia1 is generated by inverting input Va and ANDing it with input Vb. Since Va is low and Vb is high, signal line Ia1 is high. The high voltage level on Ia1 is ANDed with P0, also high, which causes output Ob0 to go high. This causes data on data line D0 to be written into queue entry b. Output Oc0 is generated by ANDing signal line Ia2 and input P0. Signal line Ia2 is generated by inverting inputs Va and Vb and ANDing them with input c. Since input Vb is high, signal line Ia2 is low, which causes output Oc0 to also be low.

If a similar analysis is performed with respect to outputs Oa1–Oa5, Ob1–Ob5 and Oc1–Oc5, it will be seen that the circuit shown in FIG. 3 will produce the truth table shown in FIG. 4A.

In this example, it is seen that none of the select lines Oa0–Oa5 are high, therefore, no value will be written into queue entry a. This result is consistent with the fact that validity bit va is low, indicating that queue entry a contains valid data. With respect to queue entry b, it is seen that select line Ob0 is high. Thus, data from data line D0 will be written into queue entry b via multiplexer MUXb. Since data from the first data line will be written into queue entry b, data from the next available data line, D1, should be written into queue entry c. Referring again to the table shown in FIG. 4A, it is seen that select line Oc1 is high. Therefore, data from data line D1 will be correctly written into queue entry c.

With respect to shift signal output block 406, it is seen that in this example, with input Va low and Vb–Vc high, only AND gate 424*a* will have a high output. Therefore, output S2 will be high and outputs S0, S1 and S3 will be low. This informs subsequent cascaded validity detect circuits that two of queue entries a, b and c are empty.

Referring now to FIGS. 3 and 4B, the operation of the embodiment of the invention shown in FIG. 3 is illustrated with respect to the case in which shifting is required. In this case, it will be assumed that the circuit shown in FIG. 3 is cascaded with a similar circuit (not shown) which controls three queue entries immediately upstream of entries a, b and c. It will also be assumed that each of the three entries immediately upstream of entries a, b and c is empty. Accordingly, inputs P0–P3, received from the cascaded validity detect circuit, are such that P0–P2 are low and P3 is high. It will also be assumed that the validity of queue entries a, b and c will be the same as before, i.e., va will be low and vb–vc will be high. Accordingly, intermediate signal lines Ia0–Ia2, Ib1–Ib2 and Ic2 will be as before. The remaining intermediate signal lines are low.

In the circuit shown in FIG. 3, it is clear that low voltage levels on P0–P2 ensure that outputs Oa0–Oa2, Ob0–Ob2 and Oc0–Oc2 are all low. However, on the fourth row, the high value on P3 is passed to AND gates 414*a*–414L. Inputs Va–Vc and signal lines Id0–Id2 are also passed to the inputs of AND gates 414*a*–414L. With the inputs to shift block 402 conditioned as described above, those with skill in the art, with reference to the circuit shown in FIG. 3, will see that the outputs on the fourth row of shift block 402 will be such that Oa3 is low, Ob3 is high and Oc3 is low. If a similar analysis is performed for rows five and six (comprising AND gates 416*a*–416L and 418*a*–418L, respectively), it will be seen that shift block 402 will produce the truth table shown in FIG. 4B.

A comparison of the truth tables shown in FIG. 4A and 4B illustrate one noteworthy feature of the invention, namely, the embodiment shown in FIG. 3 operates to first determine the appropriate logic, or voltage levels for the outputs only with respect to the status of the group of queue entries it manages. Afterwards, the circuit takes into account, the empty entries ahead of it by shifting the bit patterns of the outputs "down" with respect to the multiplier select lines. More specifically, in the no-shift example of FIG. 4A, data from the first available data line D0 is to be placed in the first available queue entry, i.e., entry b. Accordingly, it is seen that output Ob0 is set high. Similarly, the data from the second available data line D1 is to be placed into the second available queue entry, i.e., entry c, thus output Oc1 is set high.

However, in the shifting example of FIG. 4B, there are three empty entries ahead of entries a, b and c, which must first be written before data is written into any of entries a–c. Therefore, rather than receive data from the first available data line, entry b should now receive data from the fourth available data line D3. Thus, the original bit pattern which set output Ob0 high is shifted down three rows in the truth table, so that output line Ob3 is set high instead. Similarly, the high logic level on output Oc1 is shifted down to Oc4. Entries b and c will now receive data from data lines D3 and D4, respectively.

In another embodiment of the invention, the shifting of the bit patterns is responsive to the validity status of the data lines D0–D5 themselves. Specifically, in the above example, it is assumed that all of data lines D0–D5 contain valid data and, accordingly, data is written into the available entries sequentially beginning with the data on data line D0. For example, referring again to FIG. 4A, data from the first data line D0 is written into the first available entry, i.e., entry b. Similarly, data from the second data line D1 is written into the second available entry, i.e., entry c. However, in some cases, not all data lines contain valid data which is to be written into the queue. For example, if D0 does not contain valid data, but D1 does, then data from data line D1 should be written into entry b. To achieve this, it is seen from FIG. 4A that the bit pattern must be shifted down 1 row so that select line Ob1 is activated, rather than select line Ob0.

In other words, the data to be written into the queue from the input data lines is "compressed" so that only data from data lines having valid data is written into the queue. As seen from the above example, such compression is achieved through shifting the bit patterns in a fashion similar to that used to shift the bit patterns when there are empty entries ahead of the entries to be written. The exact circuitry required to achieve compression of the input data lines is, of course, dependent on the circuitry which provides the data to the queue and is largely a matter of design choice. Of course, it is understood that shifting in response to empty entries may be combined with the compression described above in other embodiments of the invention.

With the operation of the circuit shown in FIG. 3 in mind, an example of the invention will now be described in which a plurality of validity detect circuits are cascaded to control a larger random entry queue.

Figure 5A:
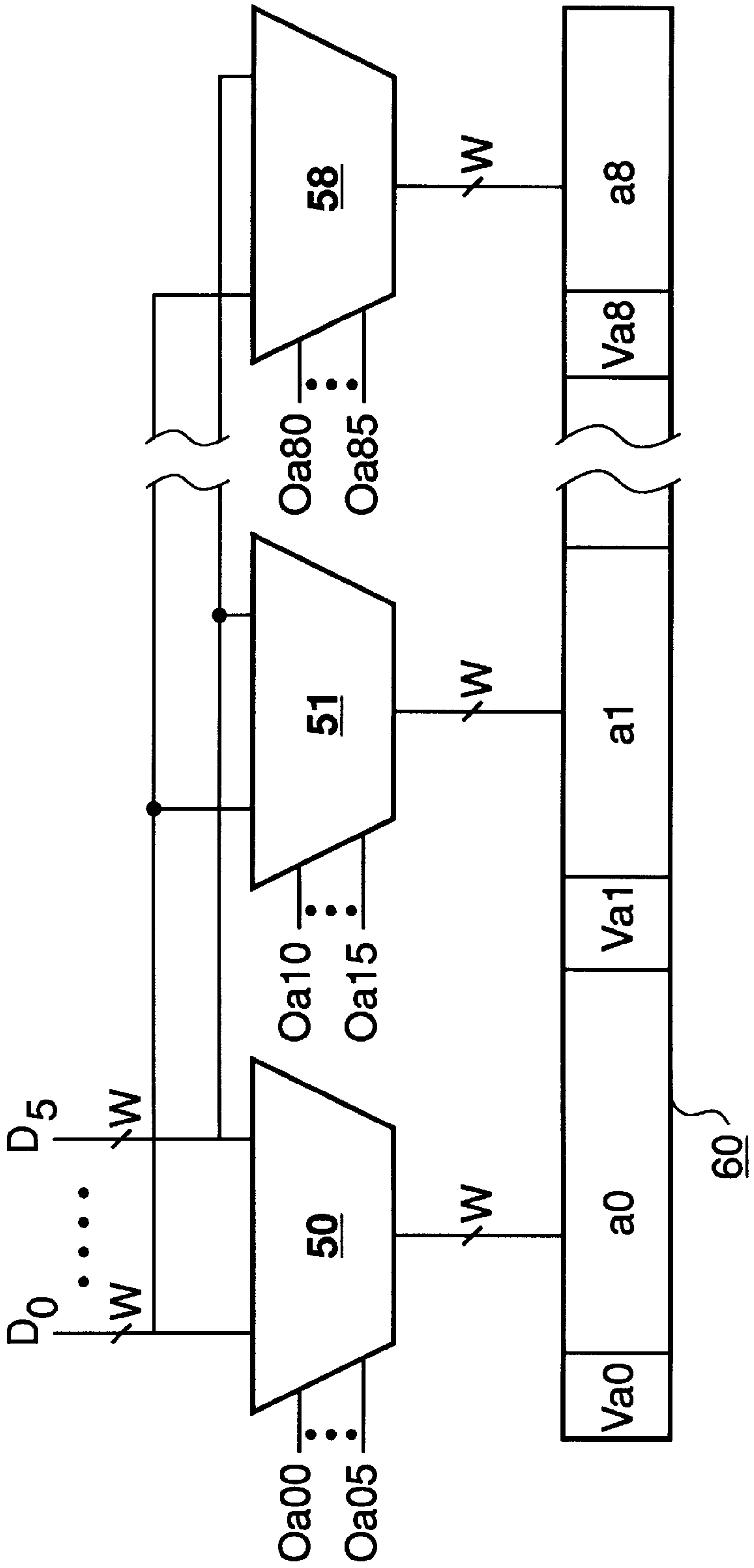
FIG. 5A is a schematic diagram of random order queue control circuitry according to another embodiment of the invention.
Figure 5B:
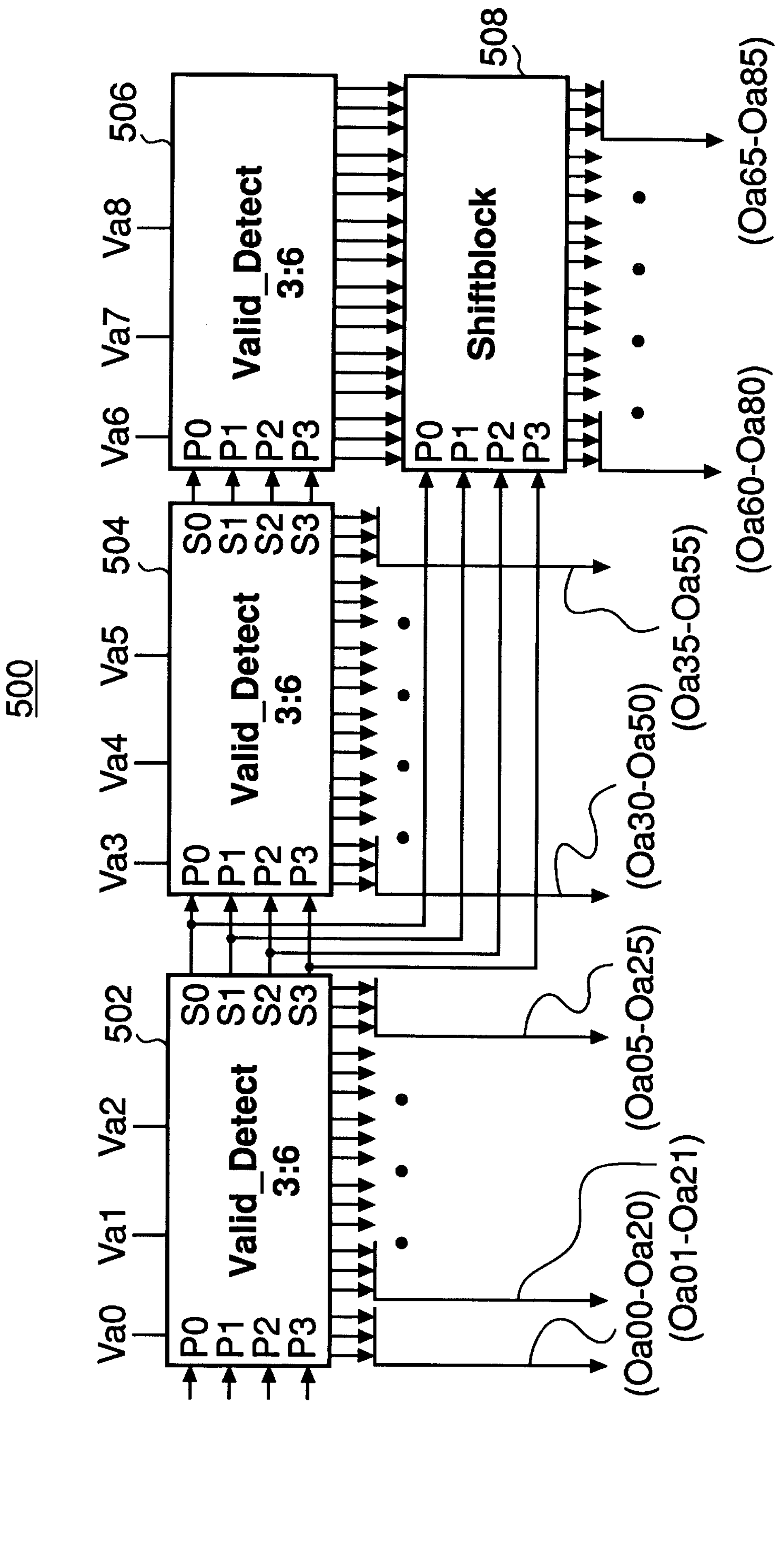
FIG. 5B is a schematic diagram of a queue control circuit according to a further embodiment of the invention.

Referring now to FIGS. 5A–5C, there is shown an embodiment of the invention for controlling a nine entry queue. In this embodiment, the queue 60 comprises nine entries a0–a8. Each entry has an associated validity bit va0–va8, respectively. Data from data lines D0–D5 (each w-bits wide) is multiplexed into queue entries a0–a8 via multiplexers 50–58 as shown in the figure. Multiplexers 50–58 are conventional 6:1 multiplexers, each of which is provided with six select lines Oa00–Oa05, through Oa80–Oa85, respectively.

Turning now to FIG. 5B, there is shown a block diagram of a queue control circuit 500 for managing the random order queue shown in FIG. 5A. In this embodiment, three validity detect circuits 502, 504 and 506 are cascaded together as shown in the diagram. Validity detect circuit 502 is referred to as the furthest upstream circuit. Validity detect circuit 504 is downstream of circuit 502 and upstream of circuit 506. Shift signals S0–S3 of validity detect circuit 502 are provided to shift inputs P0–P3 of validity detect circuit 504. Similarly, shift outputs S0–S3 of validity detect circuit 504 are provided to shift inputs P0–P3 of validity detect circuit 506.

Figure 5E:
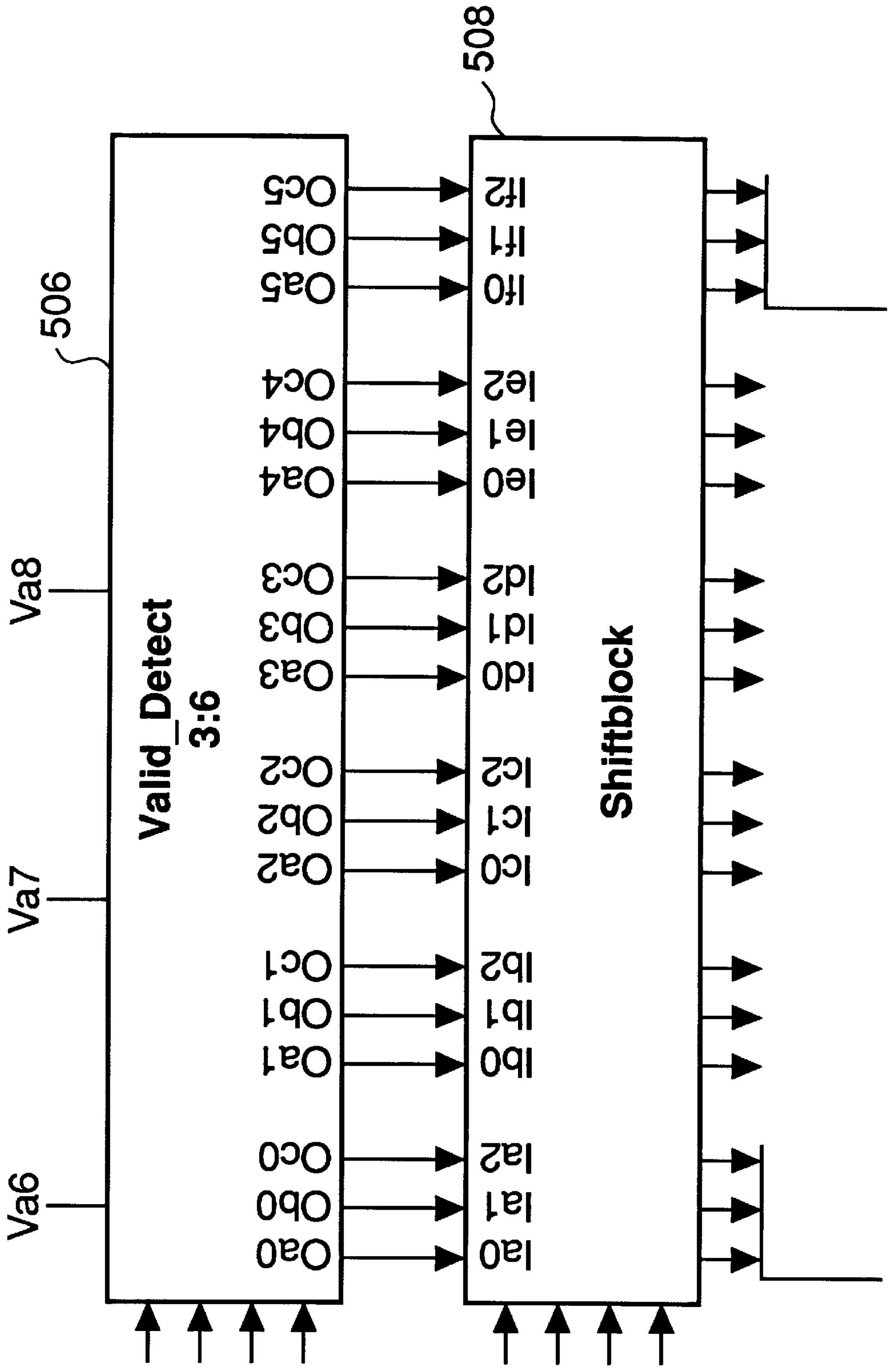
FIG. 5E is a schematic diagram of a portion of a queue control circuit according to an embodiment of the invention.

In this version of the invention, each of validity detect circuits 502, 504 and 506 comprises a shift block as shown in FIG. 3. However, as will be described in greater detail herein, the shift block is insufficient to provide the required amount of shifting for validity detect circuit 506. Therefore, the outputs Oa0–Oa5, Ob0–Ob5 and Oc0–Oc5, from validity detect circuit 506 are provided to the intermediate signal lines Ia0–Ia3 through If0–If3 of additional shift block 508 as shown in FIG. 5E. Shift block 508 also receives shift signals from validity detect circuit 502. This provides a second order of shifting for outputs Oa60–Oa80 through Oa65–Oa85.

The operation of this version of the invention is described with respect to the following examples.

In the first example, it is assumed that queue entries a0–a3 and a6–a8 all contain valid entries. Queue entries a4 and a5 are empty. Therefore, validity bits va0–va3 and va6–va8 are low, while va4 and va5 are high. Since validity bits va0–va2 are all low, validity detect circuit 502 recognizes that no shifting is required to be operated on the intermediate lines produced by block 504. Therefore, validity detect circuit 502 sets shift signal S0 high and S1–S3 low.

Inputs P0–P3 of validity detect circuit 504 detect the output signals from outputs S0–S3 of validity detect circuit 502. Since S0 is high, validity detect circuit will perform no shifting and will control its block of output lines Oa30–Oa50 through Oa35–Oa55, according to the status of validity bits va3–va5. Since validity detect circuit 504 recognizes that queue entry a4 is the first available entry, output line Oa40 is set high. Since queue entry a5 is the second available entry, validity detect circuit 504 sets output Oa51 high. Validity detect circuit 504 also sets output line S2 high to inform validity detect circuit 506 that, of queue entries a3–a5, two are empty. It will be observed that the operation of validity detect circuit 504 described here is substantially similar to that of the no-shift example described previously with respect to FIG. 4 in which Va was low while Vb and Vc were high.

Validity detect circuit 506 receives the output signals S0–S3 from validity detect circuit 504 on inputs P0–P3. In this case, it has been assumed that queue entries a6–a8 contain valid data. Accordingly, no data is to be written in any of these queue entries and output lines Oa60–Oa80 through Oa65–Oa85 are set low.

FIG. 5C is a truth table illustrating the status of the output lines Oa00–Oa20 through Oa65–Oa85, which correspond to similarly labeled multiplexer select lines, in the above example. With reference to FIG. 5A, it will be seen that data from data line D0 will be written into queue entry a4 and data from data line D1 will be written into queue entry a5. No other entries will be written since they are all valid.

In another example, it is assumed that the status of queue entries a3–a8 is the same as described above. However, in this case, it will be assumed that queue entries a0–a2 are all empty. Accordingly, validity detect bits va0–va2 and va4 and va5 are high, and va3, va6–va7 are low.

Since queue entries a0–a2 are empty, validity detect circuit 502 will provide signals on its output line such that data from the first three available data lines D0–D2 is written into queue entries a0–a2, respectively. Accordingly, outputs Oa00, Oa11, and Oa22 are set high. Validity detect circuit 502 also sets output line S3 high to indicate to validity detect circuit 504 the value of its outputs must be shifted down appropriately.

Validity detect circuit 504 recognizes that nothing is to be written into queue entry a3 and data from the first two available data lines is to be written into empty queue entries a4 and a5. If no shifting was required, this would produce the truth table shown in FIG. 5C as described previously. However, in this case, the high signal on output line Oa40 is shifted down three rows in the truth table so that output line Oa43 is raised instead. Similarly, the high on output line Oa51 is shifted down to output line Oa54. Now, data from the fourth and fifth available data lines, D3 and D4, will be written into queue entries a4 and a5, respectively.

Validity detect circuit 504 also sets output line S2 high, indicating to validity detect circuit 506 that two of entries a3–a5 are empty. Since entries a6–a8 all contain valid data, validity detect circuit 506 sets all of its outputs low. The status of the output circuit 500 in this example is illustrated in the table shown in FIG. 5D.

In the above two examples, it was assumed that queue entries a6–a8 all contained valid data, and therefore, outputs Oa60–Oa80 through Oa65–Oa85 were always low. Of course, it is understood that if any of entries a6–a8 were empty, then the operation of validity detect circuit 506 is substantially the same as validity detect circuits 502 and 504, with the exception that the outputs of validity detect circuit 506 are provided with a second order of shifting by shift block 508. The reason for this is as follows. According to one advantageous embodiment of the invention, it is desirable that each validity detect circuit provided in the queue control circuit contains identical circuitry. Therefore, modular circuit design is used for queue control circuits which can manage any size random order queue. Specifically, if it is desired to design a control circuit to manage an 18 entry queue, for example, then three additional validity detect circuits could simply be cascaded to the circuit shown in FIG. 500. This simplifies the design and provides good scaling characteristics with respect to the number of queue entries. Moreover, by cascading the circuits shown in FIG. 3, it is seen that only the first stage of logic (decode function) requires compliment signals, the remaining stages require only single rail signals. Therefore, the validity detect circuits are easily implemented in domino logic, thus improving the performance of the queue control circuit.

However, referring again to the above example, it is seen that validity detect circuit 504 can, at most, inform validity detect circuit 506 that there are three empty entries (a3–a5) upstream of entries a6–a8. In fact, referring again to the above example, it is seen that there are actually five empty entries (a0–a2 and a4–a5) upstream of entries a6–a8 controlled by validity detect circuit 506. To compensate for this, additional shift block 508 is provided. Shiftblock 508 is substantially the same as shift block 402 shown in FIG. 3, and its operation has been described previously. However, in this case, all intermediate lines, including lines Ia0–Ia2, Ib1–Ib2 and Ic2, formerly coupled to the validity bit input block 404, are coupled directly to the output lines Oa0–Oa5, Ob0–Ob5, and Oc0–Oc5 of validity detect circuit 506. This is shown in FIG. 5E. This provides the requisite shifting required for output lines provided from shiftblock 508 to the multiplexer select lines.

Therefore, if the above example is modified to assume that queue entry a6 is empty, then the high signal (which would be provided on output Oa60 in a no-shift example) is shifted down five rows to Oa65. The ability to add extra shifting is especially important in embodiments of the invention in which there are more data lines than the number of entries handled by a circuit module.

In still a further embodiment of the invention, as the size of the queue is scaled up, additional orders of shifting are provided. For example, in a 12 entry queue, an additional validity detect circuit for queue entries a9–a11 is cascaded to validity detect circuit 506. The outputs from this additional validity detect circuit are first shifted by outputs S0–S3 of validity detect circuit 506 (not shown). After this first order of shifting, there would be provided to a first additional shift block (not shown) which would be coupled to shift signals S0–S3 of validity detect circuit 504, and then to a third shift block (not shown) which would be coupled to outputs S0–S3 of validity detect circuit 502. As the queue is further increased in size, similar additional validity detect circuits and shift blocks would be provided. In one specific embodiment of the invention, the logic comprising shift block 508 is substantially the same as the logic shown in shift block 402 of FIG. 3.

It is to be understood that validity detect circuits according to the present invention are not limited to controlling groups of three queue entries as shown in the embodiment of FIG. 3. Those with skill in the art will have the ability to modify the circuit shown in FIG. 3 to produce validity detect circuits which control two, four, five or more queue entries. Such embodiments are useful to reduce the logic delay time for larger queues.

Reading information from the queue is performed in a manner similar to writing to the queue as described above. The primary difference being that, for a queue having m entries, n data input lines and n output lines, writing requires a circuit having m multiplexers, each with n inputs, whereas reading requires a circuit having n multiplexers, each having m inputs. This is described in greater detail with respect to FIGS. 6 and 7.

Figure 6:
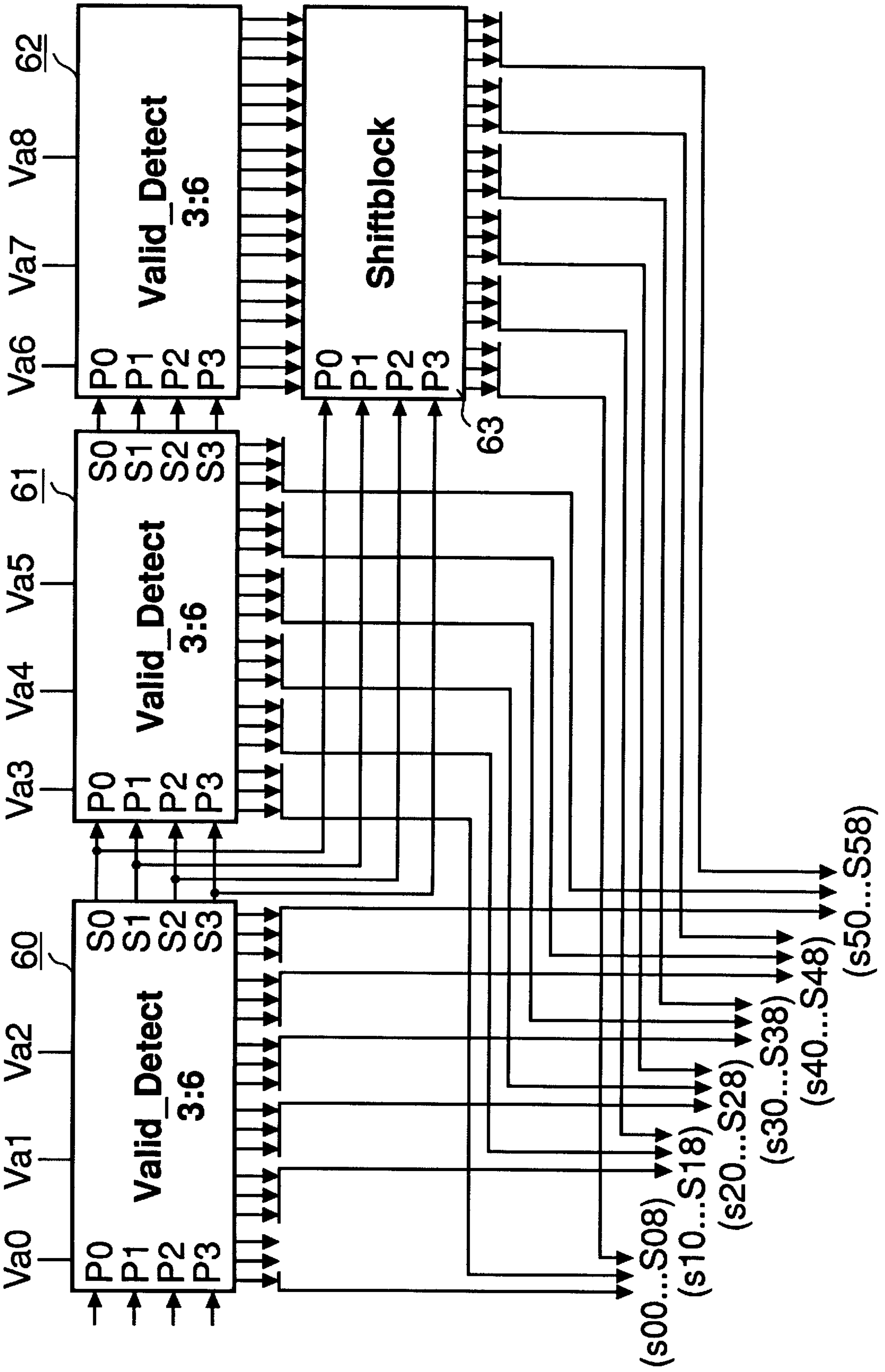
FIG. 6 is a schematic diagram of a queue control circuit according to another embodiment of the invention.

FIG. 6 shows an embodiment of the invention having three validity detect circuits 60, 61 and 62 cascaded together as shown.

In this version of the invention, validity detect circuits 60–62 operate substantially as described above with respect to the queue control circuit 500 for writing to the queue. Also, the exemplary validity detect circuit shown in FIG. 3 is suitable for use in validity detect circuits 60–63.

Figure 7:
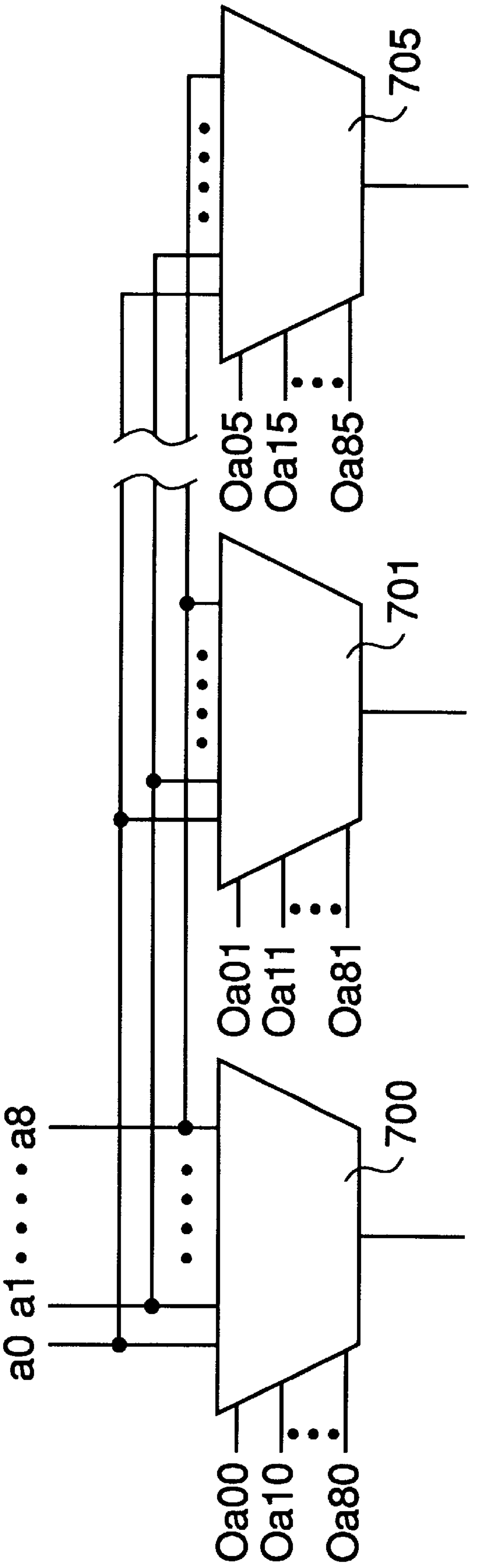
FIG. 7 is a schematic diagram illustrating an output multiplexer arrangement according to still a further embodiment of the invention.

However, the outputs of the validity detect circuit 60–62 are arranged differently with respect to the multiplexer select lines for multiplexers 700–705 shown in FIG. 7. In this case, output select lines S00–S08 correspond to the select lines Oa00–Oa80 of multiplexer 700. Similarly, output lines S10–S18 correspond to multiplexer select lines Oa01–Oa81 on multiplexer 701, and so forth so that output lines S50–S58 correspond to multiplexer select lines Oa05–Oa85 on multiplexer 705.

This arrangement may be further understood by contrasting it with the write version of the invention. Referring again to FIGS. 5A and 5D, it is seen that there is a one to one correspondence between the column of output lines Oa0–Oa5 and select lines Oa0–Oa5 of multiplexer 50 which provides input to queue entry a0. By contrast, in the read version of the invention, there is a one to one correspondence between a row of outputs, i.e., Oa00–Oa80, and the select lines Oa00–Oa80 of multiplexer 700 which passes data to first output data line D0. In general then, it is clear that each column of data of the truth table shown in FIG. 5D represents a bit pattern which is provided to the select lines of one of the input multiplexers 50–58, while each row of the truth table represents a bit pattern to be provided to the select lines of one of the output multiplexers 700–705. It will be recalled that the validity detect block detects the logic 1 of input lines. If the random order queue entry has only a valid bit which means valid data with logic value 1 and empty with logic value 0, the inversion of the valid bit is the input to the validity detect block that generates the select line of the input multiplexers. Likewise, the validity detect block for the output select multiplexers will take the valid bit without inversion as the validity bit.

While the invention has been particularly shown and described with reference to the above embodiments, it will be understood by those skilled in the art that various changes in form and detail may be made therein without departing from the scope and spirit of the invention. All patents, patent applications, and other publications referenced herein are hereby incorporated by reference as though set forth in full.

What is claimed is:

1. A circuit useful to manage a random order queue having a plurality of queue entries, the queue entries having associated validity bits that indicate whether the associated queue entry contains valid data, and associated multiplexers that pass data from a selected data line into the associated queue entry, the selected data line being selected from a plurality of data lines in response to an asserted bit in a bit pattern impressed on the select lines of the associated multiplexer, the circuit comprising:

a first plurality of inputs for receiving validity signals responsive to a first group of validity bits associated with a first group of queue entries;

a second plurality of inputs for receiving shift signals responsive to a second group of validity bits associated with a second group of queue entries;

logic for generating bit patterns for the multiplexers associated with the first group of queue entries, the bit patterns being responsive to the validity signals from the first group of validity bits;

logic for shifting the asserted bits in the bit patterns responsive to the shift signals;

shift block means for generating output signals used to control corresponding select lines by impressing the bit patterns on the select lines of the multiplexers, the shift block means having a multiple rows of logic gates, the select signals being responsive to the shift signals and the validity signals, and a validity detect circuit coupled to each queue for detecting the validity status of the queue entries.

2. A circuit as in claim 1 further comprising a second plurality of outputs for providing shift signals responsive to the first group of validity bits to additional circuits.

3. A system for managing a random order queue having a plurality of queue entries, each queue entry having an associated validity bit which indicates whether the queue entry contains valid data, the system comprising:

a first circuit having a first plurality of inputs for receiving validity signals responsive to a first group of validity bits, a first plurality of outputs for providing select signals to a first group of multiplexers coupled to the queue, the select signals being responsive to the validity signals, and a second plurality of outputs for providing shift signals responsive to the first group of validity bits;

a second circuit having a first plurality of inputs for receiving validity signals responsive to a second group of validity bits, a second plurality of inputs for receiving shift signals from the second plurality of outputs of the first circuit, a shift block means for generating outputs used to control corresponding select lines on a second group of multiplexers coupled to the queue, the shift block means having a plurality of rows of logic gates, the outputs being responsive to the received shift signals and the validity signals responsive to the second group of validity bits, and a validity detect circuit coupled to each queue for detecting the validity status of the queue entries.

4. A system as in claim 3 wherein the plurality of outputs for providing select signals to a second group of multiplexers is provided to a shift block.

5. A system as in claim 3 wherein the first circuit further comprises a second plurality of inputs for receiving shift signals responsive to a third group of validity signals responsive to a third group of validity bits.

6. A system as in claim 3 wherein the second circuit further comprises a second plurality of outputs for transmitting shift signals which are responsive to the validity signals responsive to the second group of validity bits.

7. A method of managing a random order queue having a plurality of queue entries and including a circuit for controlling select lines of a plurality of multiplexers which access data in the queue entries, the method comprising:

detecting a first set of validity bits associated with a first group of queue entries;

generating a bit pattern responsive to the first set of validity bits, the bit pattern having a high bit for activating a select line of one of the multiplexers;

receiving a shift signal responsive to a second set of validity bits associated with a second group of queue entries;

using a shift block having a plurality of rows of logic gates to shift the high bit in the bit pattern in response to the shift signal, impressing signals on the select lines of the multiplexer, the signals being responsive to the bit pattern.

8. A system for managing a random order queue having a plurality of queue entries, each queue entry having an associated validity bit which indicates whether the queue entry contains valid data, the system comprising:

a plurality of cascaded modular circuits, each circuit including:

a first plurality of inputs for receiving validity signals responsive to a first group of validity bits associated with a first group of queue entries;

a second plurality of inputs for receiving shift signals responsive to a second group of validity bits associated with a second group of queue entries;

logic for generating bit patterns for multiplexers associated with the first group of queue entries, the bit patterns being responsive to the validity signals from the first group of validity bits;

logic for shifting the asserted bits in the bit patterns responsive to the shift signals;

a validity detect circuit having a plurality of inputs for receiving validity signals responsive to the first group of validity bits;

a shift block having a plurality of rows of log gates, a plurality of inputs for receiving shift signals from an upstream circuit, a first plurality of outputs for providing shift signals to a down stream circuit, and a second plurality of outputs for providing select signals to multiplexers coupled to the queue, the select signals being responsive to the validity signals and the shift signals received from the upstream circuit.

9. A system as in claim 8 wherein each queue entry is associated with a multiplexer which selectively receives data from a plurality of data lines and writes the data into the associated queue entry.

10. A system as in claim 8 wherein each queue entry is associated with a plurality of multiplexers, each multiplexer coupled to an associated data bus, each multiplexer adapted to selectively read data from one of the queue entries and pass the data to the associated data bus.

* * * * *